(12) United States Patent
Eronen et al.

(10) Patent No.: US 11,487,496 B2
(45) Date of Patent: Nov. 1, 2022

(54) CONTROLLING AUDIO PROCESSING

(71) Applicant: Nokia Technologies Oy, Espoo (FI)

(72) Inventors: Antti Johannes Eronen, Tampere (FI);
Jussi Artturi Leppänen, Tampere (FI);
Arto Lehtiniemi, Lempaala (FI);
Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 17 days.

(21) Appl. No.: 16/882,049

(22) Filed: May 22, 2020

(65) Prior Publication Data
US 2020/0379719 A1 Dec. 3, 2020

(30) Foreign Application Priority Data

Jun. 3, 2019 (EP) .................................... 19177934

(51) Int. Cl.
*G06F 3/16* (2006.01)
*H04R 3/12* (2006.01)
(52) U.S. Cl.
CPC .............. *G06F 3/165* (2013.01); *H04R 3/12* (2013.01)
(58) Field of Classification Search
CPC .... G06F 1/1652; G06F 1/1618; G06F 1/1615; G06F 1/1616; G06F 3/165; H04M 1/0268; H04M 2250/16; H04R 3/12; H04R 3/04; H04R 5/02; H04S 7/307
See application file for complete search history.

(56) References Cited

U.S. PATENT DOCUMENTS

| 10,564,675 | B2* | 2/2020 | Ka | G06F 1/1694 |
| 2001/0011993 | A1* | 8/2001 | Saarinen | H04R 5/04 |
| | | | | 345/156 |
| 2014/0157125 | A1* | 6/2014 | Seo | G06F 3/165 |
| | | | | 715/716 |
| 2014/0210740 | A1* | 7/2014 | Lee | G06F 1/1688 |
| | | | | 345/173 |
| 2018/0329672 | A1* | 11/2018 | Sadak | G06F 1/1677 |

(Continued)

FOREIGN PATENT DOCUMENTS

| CN | 108551636 A | 8/2019 |
| EP | 1124175 A2 | 8/2001 |

(Continued)

OTHER PUBLICATIONS

Extended European Search Report received for corresponding European Patent Application No. 19177934.7, dated Dec. 13, 2019, 12 pages.

*Primary Examiner* — Dino Kujundzic
(74) *Attorney, Agent, or Firm* — Harrington & Smith

(57) ABSTRACT

An apparatus comprising means for: receiving an indication of a form factor of a device; selecting an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; controlling audio processing of audio associated with the selected audio component; and providing at least the processed audio for audio output by one or more loudspeakers.

20 Claims, 6 Drawing Sheets

(56) References Cited

U.S. PATENT DOCUMENTS

| | | | | |
|---|---|---|---|---|
| 2019/0007620 A1* | 1/2019 | Lei | ................. | H04N 5/247 |
| 2019/0278324 A1* | 9/2019 | Yoon | ................. | H05K 7/20172 |
| 2021/0058704 A1* | 2/2021 | Tang | ................. | H04M 1/0216 |
| 2021/0099570 A1* | 4/2021 | Schenone | ............. | G06F 1/1615 |

FOREIGN PATENT DOCUMENTS

| | | |
|---|---|---|
| EP | 1566950 A1 | 8/2005 |
| EP | 2 738 640 A2 | 6/2014 |

\* cited by examiner

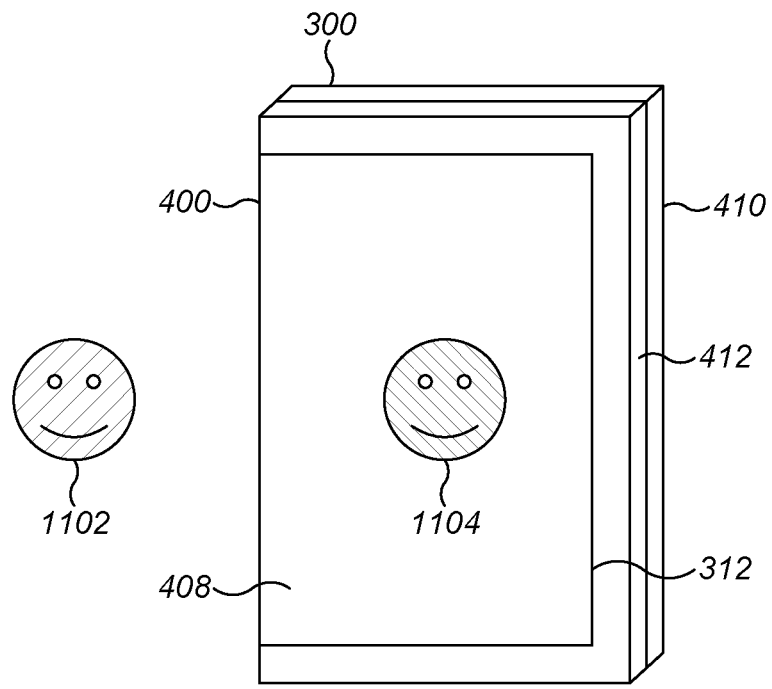
FIG. 11
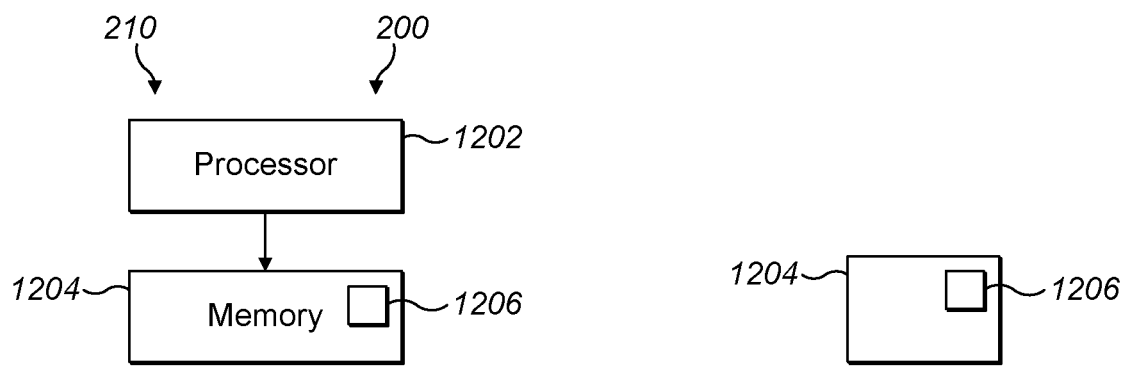
FIG. 12A
FIG. 12B

CONTROLLING AUDIO PROCESSING

TECHNOLOGICAL FIELD

Embodiments of the present disclosure relate to controlling audio processing. Some relate to controlling audio processing in a device that can change form factor.

BACKGROUND

Devices that can provide audio data to onboard or external loudspeakers are known. The audio data can correspond to an audio file, an audio stream, and/or a particular software application assigned to a particular display area of a display of the device.

Devices that can change form factor are also known, such as flexible foldable devices.

BRIEF SUMMARY

The scope of protection sought for various embodiments of the invention is set out by the independent claims. The examples and features, if any, described in this specification that do not fall under the scope of the independent claims are to be interpreted as examples useful for understanding various embodiments of the invention.

According to various, but not necessarily all, embodiments there is provided an apparatus comprising means for: receiving an indication of a form factor of a device; selecting an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; controlling audio processing of audio associated with the selected audio component; and providing at least the processed audio for audio output by one or more loudspeakers.

In some, but not necessarily all examples, the form factor is dependent on flexing of a body of the device.

In some, but not necessarily all examples, the form factor is dependent on folding of a body of the device.

In some, but not necessarily all examples, the graphical user interface object corresponds to a spatial audio sound source and/or a software application and/or an audio content item.

In some, but not necessarily all examples, the first display area is configured to move relative to a second display area of the device when the form factor of the device is changed, and wherein the selecting an audio component is dependent on which one of the first display area and the second display area the graphical user interface object is assigned to.

In some, but not necessarily all examples, the selecting an audio component is dependent on which side of a fold line the location is.

In some, but not necessarily all examples, the selecting an audio component is dependent on an orientation of the device.

In some, but not necessarily all examples, an extent of the controlling audio processing is dependent on an extent of a change of form factor of the device and/or is dependent on an extent of a change of orientation of the device with respect to a user of the device.

In some, but not necessarily all examples, the controlling audio processing comprises controlling an audio signal processing effect.

In some, but not necessarily all examples, the audio signal processing effect comprises at least one of: filtering; reverberation; echo; decorrelation; divergence; spreading.

In some, but not necessarily all examples, the apparatus comprises means for controlling a position of a spatial audio sound object in a sound scene in dependence on the change in form factor of the device.

In some, but not necessarily all examples, the apparatus comprises means for concurrently providing audio associated with a selected audio component and a non-selected audio component for output by the one or more loudspeakers, wherein audio associated with the selected audio component is processed differently from audio associated with the non-selected audio component.

In some, but not necessarily all examples, the apparatus is embodied as the device or as a controller of the device.

According to various, but not necessarily all, embodiments there is provided a method comprising: receiving an indication of a form factor of a device; selecting an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; controlling audio processing of audio associated with the selected audio component; and providing at least the processed audio for audio output by one or more loudspeakers.

According to various, but not necessarily all, embodiments there is provided a computer program that, when run on a computer, performs: causing receiving an indication of a form factor of a device; causing selecting an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; causing controlling audio processing of audio associated with the selected audio component; and causing providing at least the processed audio for audio output by one or more loudspeakers.

BRIEF DESCRIPTION

Some examples will now be described with reference to the accompanying drawings in which:

FIG. 1 illustrates an example of a method;
FIG. 2 illustrates an example of an apparatus;
FIG. 3 illustrates an example of a system;
FIG. 4 illustrates an example of a foldable apparatus in an open state;
FIG. 5 illustrates an example of a foldable apparatus in a partially-folded state;
FIG. 6 illustrates an example of a foldable apparatus in a folded state;
FIG. 7 illustrates an example of a sub-method;
FIG. 8 illustrates an example of low pass filter frequency response curves;
FIG. 9A illustrates an example of a foldable apparatus in an open state, and in FIG. 9B the apparatus is in a first partially-folded state, and in FIG. 9C the apparatus is in a second partially-folded state, and in FIG. 9D the apparatus is in a folded state.

FIG. 11 illustrates an example of a foldable apparatus in a folded state, rendering spatial audio sound objects; and FIG. 12A illustrates an example of an apparatus, and FIG. 12B illustrates an example of a delivery mechanism for a computer program.

DETAILED DESCRIPTION

Figure 1:
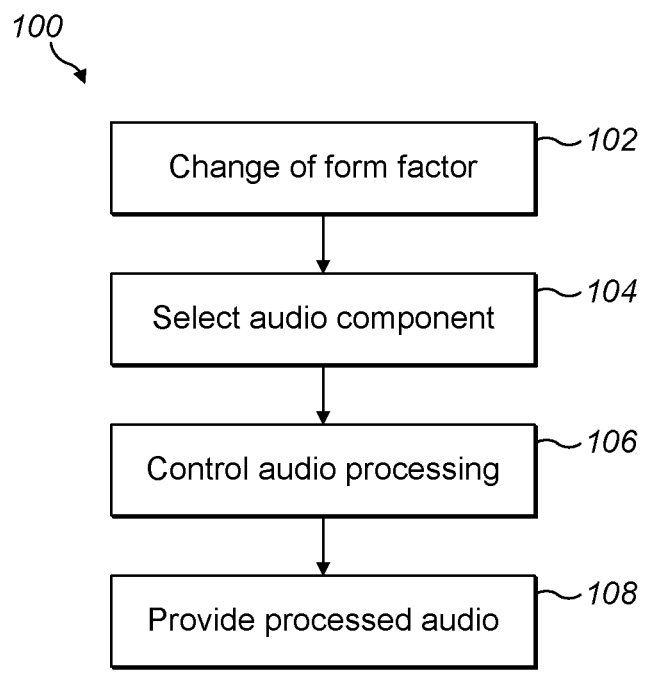

FIG. 1 illustrates an example of a method 100 for controlling audio processing.

The method 100 may comprise determining whether the form factor of a device has changed. The method 100 comprises, at block 102, receiving an indication of a form factor of the device. If the form factor has not changed, audio may not be processed according to the method 100.

If the form factor has changed, the method 100 proceeds to block 104, which comprises selecting an audio component. The selection is based on a condition other than the form factor changing.

The method 100 then comprises, at block 106, controlling audio processing of audio associated with the selected audio component.

The method 100 then comprises, at block 108, providing at least the processed audio for audio output by one or more loudspeakers.

According to some, but not necessarily all examples, the method 100 can be used to apply an audio signal processing effect such as low-pass filtering to selected audio data when the device is folded, to make audio associated with a non-visible (e.g. rear-side) section of the folded device sound ambient compared with audio associated with a visible user-facing section of the folded device. This makes the foldable device more intuitive to use by giving the impression of foreground and background audio. Various uses of the method 100 including the above example are described herein.

Figure 2:
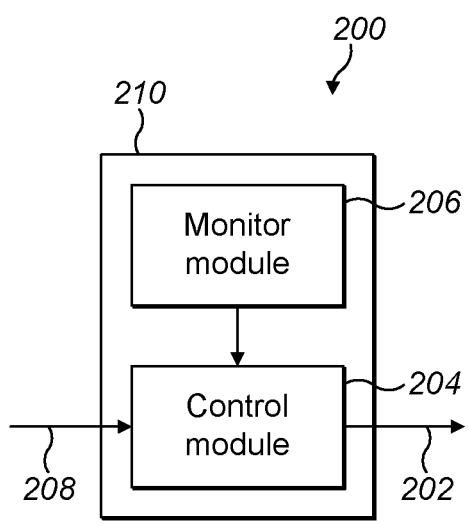
Figure 3:
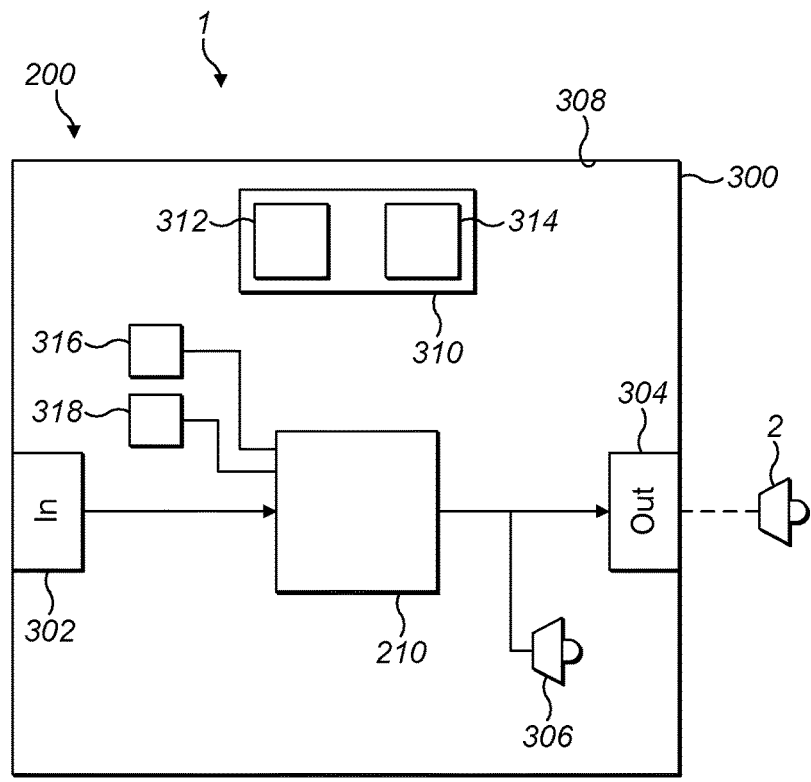

FIGS. 2, 3 and 12A illustrate an example apparatus 200 for carrying out the method 100.

The apparatus 200 comprises a controller 210. The controller 210 is configured to receive audio data 208. The audio data 208 may be encoded or transcoded audio data 208. The audio data 208 may be in a downmixed format. The audio data 208 may be received in real time for live playback by one or more loudspeakers. The audio data 208 may correspond to audio-only or audio-visual media.

FIG. 2 illustrates an example implementation of the apparatus 200. The controller 210 comprises a control module 204 configured to process audio data associated with the selected audio component. The control module 204 is configured to provide processed audio data 202 including the processed audio associated with the selected audio component, for output by one or more loudspeakers.

The controller 210 comprises a monitor module 206 configured to monitor the form factor of the device. The audio processing by the control module 204 may be dependent on the monitoring by the monitor module 206. It would be appreciated that the apparatus 200 could be implemented in various other ways, not limited to the way shown in FIG. 2.

The controller 210 may be provided by any suitable hardware or circuitry. The modules may be hardware modules of the controller 210 or may be functional modules of the controller 210 and can be enabled by firmware or software. For example, in some implementations the controller 210 is a processor, for example a central processing unit, running an operating system. The modules represent functionality provided by the operating system when run on the processor.

FIG. 3 illustrates an example of a system 1 implemented using an apparatus 200, for example, a portable electronic device 300. The portable electronic device 300 may, for example, be a hand-portable electronic device that has a size that makes it suitable to carried on a palm of a user or in an inside jacket pocket of the user.

The apparatus 200 may comprise an input communications interface 302 for communicating externally to receive data, for example to receive the audio data 208 from an external server (not shown). The input communications interface 302 may, for example, comprise a radio receiver or transceiver.

In some examples, audio data 208 may be stored internally in the apparatus 200 rather than streamed from an external server.

The apparatus 200 may comprise an output communications interface 304 for communicating externally to transmit data, for example to transmit the processed audio data 202 for audio output by one or more external loudspeakers 2. The output communications interface 304 may, for example, comprise a radio transmitter or transceiver.

The one or more external loudspeakers 2 may be implemented as a wearable pair of headphones, or a non-wearable stereo or surround loudspeaker system. The external loudspeakers 2 may form part of the system 1 or may be supplied separately.

The apparatus 200 may comprise one or more onboard loudspeakers 306. In some examples, the processed audio data 202 may be transmitted for audio output by the one or more onboard loudspeakers 306.

The apparatus 200 comprises the controller 210 for performing the method 100.

The device 300 comprises a body 308 defining an exterior surface of the device 300. The body 308 may house internal components such as the controller 210. The exterior surface may at least partially enclose the internal components.

The illustrated device 300 has a form factor, defined by size, shape, and style. Examples of electronic device styles include: bar; brick; slate; taco; and wearable. Examples of electronic device sizes within the slate style include smartphones which have diagonal screen sizes of less than 13 centimetres; and phablets and tablets which have larger diagonal screen sizes. Examples of electronic device shapes within the slate style include quadrilaterals which may have one or more rounded corners.

The form factor of the device 300 is changeable. In a specific example, the size is changeable to change a maximum width, length and/or depth dimension of the device 300. In other examples, the size, shape and/or style is changeable.

According to some, but not necessarily all examples, the body 308 is flexible and a change of form factor is enabled by flexing the body 308 of the device 300.

In an example, flexing the body 308 may comprise bowing the body 308 in a forwards and/or in a backwards direction relative to a neutral unflexed state. Bowing comprises causing lengthwise extremities of the flexed body 308 to move downward or upward and towards each other. The flexed body 308 bows as one moves along its length and forms an arc which presents a convex cambered upper surface and a concave cambered lower surface, or a concave upper surface and convex lower surface depending on the direction of the bowing. The body 308 may remain untwisted.

In other examples, the body 308 may be inflexible, and movement of the lengthwise extremities towards each other may be enabled via a hinge interconnecting inflexible body sections. For instance, the body 308 may have a clamshell style.

The bowing and/or the hinge may enable folding of the device 300. The device 300 may be foldable up to a value from the range approximately 90 degrees to approximately 235 degrees compared to a starting angle. In a specific example, the device 300 may be foldable approximately in half, up to a value from the range 150 to 210 degrees compared to a starting angle. For a flush finish, the maximum fold angle may be approximately 180 degrees compared to a starting angle.

In some examples, flexing the body 308 may comprise twisting the body 308 into a corkscrew configuration. The lengthwise extremities of the body 308 are relatively rotated about a lengthwise axis in opposite senses. The body 308 twists as one moves along its length and forms a twisting spiral.

In some examples, flexing the body 308 may comprise rolling the body 308 into a rolled configuration, via bowing or other actions. In the rolled configuration, the body 308 may take the shape of a band or a spiral. The body 308 rolled into a band may define an aperture sized to accommodate a user's body part such as a wrist.

In a further example, the device 300 may be inflexible, and sections of the body 308 may have concealed and unconcealed configurations. For example, the body 308 may have a slider style with slider rails, or a swivel style with a hinge for enabling rotation of device sections. In some of these configurations, the device sections may always face a same direction, but in the concealed configuration at least one section is concealed by another section, for example for stowing. In a further example, the change of form factor comprises undocking sections of the device 300.

The force required to change the form factor may be provided directly by the user or via one or more actuators. Biasing means such as springs or a resilient housing material (not shown) can optionally be employed to bias towards a particular form factor. Releasable locking means (not shown) can optionally be employed to hold the device 300 in a particular form factor.

In some, but not necessarily all examples, the body 308 of the device 300 may be deformable. The deformability may enable the bowing and/or twisting and/or rolling. In some examples, the body 308 may be stretchable and/or compressible.

The device 300 comprises a user input/output module 310. The user input/output module 310 may provide a graphical user interface (GUI).

The user input/user output module 310 is configured to provide input control signals to the controller 210 and to receive output control signals from the controller 210.

The user input/user output module enables user input to the apparatus 200 and user output from the apparatus 200. The user input/user output module comprises at least a display 312 for enabling user output from the apparatus 200. The display 312 may be any device 300 that enables visual perception of an image. The display 312 may, for example, be a display screen such as a liquid crystal display screen or an organic light emitting diode (OLED) display screen, or it may be a projector or near eye display, for example.

In a specific example in which the device 300 is flexible, the display 312 may be a flexible display 312 such as a flexible OLED display, positioned on a flexible area of the flexible body 308 of the device 300. A fold line 400 may intersect an area of the flexible display 312, splitting the display 312 into a first display area 406 and a second display area 408 as shown in later Figures. Alternatively, separate non-flexible displays may be provided to either side of the fold line 400. The flexible display 312 may be flexible over its entire surface or flexible just at the fold line 400. In some examples, the location of the fold line 400 may be stored in a memory of the apparatus 200.

The user input/user output module 310 comprises at least a user input device 314 for enabling user input to the apparatus 200. In some, but not necessarily all examples, the user input device 314 comprises a touch screen. The touch screen may be a flexible touch screen. The user input/output module 310 may be embodied as an integrated touch screen display.

At least part of the user input/output module 310 may be operable by a user when the device 300 is in a first form factor and when the device 300 is in a second form factor, so that the user can continue to operate at least some software applications on the device 300 in both form factors.

A form factor sensor 316 is illustrated. The form factor sensor 316 is used to determine whether the form factor of the device 300 has changed. The illustrated form factor sensor 316 is onboard the device 300 but it could be external. The form factor sensor 316 may comprise a light sensor such as a camera to detect proximity of sections of the device 300 caused by folding. The form factor sensor 316 may comprise a hall effect sensor for sensing a magnetic field disturbance to detect proximity of sections of the device 300 caused by folding. The form factor sensor 316 could be implemented in various ways.

In an example embodiment the user input/user output module 310 may be configured to detect when its form factor has been changed. This provides the function of a form factor sensor 316, without the need for a dedicated sensor unit. For example, the flexible touch screen may be capacitive and changes in capacitance caused by flexing may be detectable. The apparatus 200 may be configured to process information from the user input/user output module 310 to detect whether the form factor has changed, and optionally the extent of the change (e.g. bending degree). The foldable display may provide the information about its shape to the controller 210.

An orientation sensor 318 is illustrated. The orientation sensor 318 is used to determine which way at least part of the device 300 is oriented relative to a user of the device 300. This is useful when the device 300 has been folded, for determining which section of the device 300 is user-facing. The orientation sensor 318 may comprise a camera, which may be the same as or different from the camera form factor sensor 316. The camera may be a front-facing camera, on a same face of the device 300 as at least part of the display 312. The camera is used to check if a feature such as the user is visible, to indicate which way the camera is pointing and therefore the orientation of the device 300. In some examples, the orientation sensor 318 may comprise a magnetometer. In some examples, the orientation sensor 318 may comprise an inertial measurement unit such as a gyroscope and/or accelerometer for tracking changes in orientation.

The orientation sensor 318 could be implemented in various ways. In an example embodiment the orientation sensor 318 is a virtual sensor using information from an accelerometer and gyroscope on the apparatus 200. A magnetometer may also be used in addition to the accelerometer and gyroscope.

Figure 4:
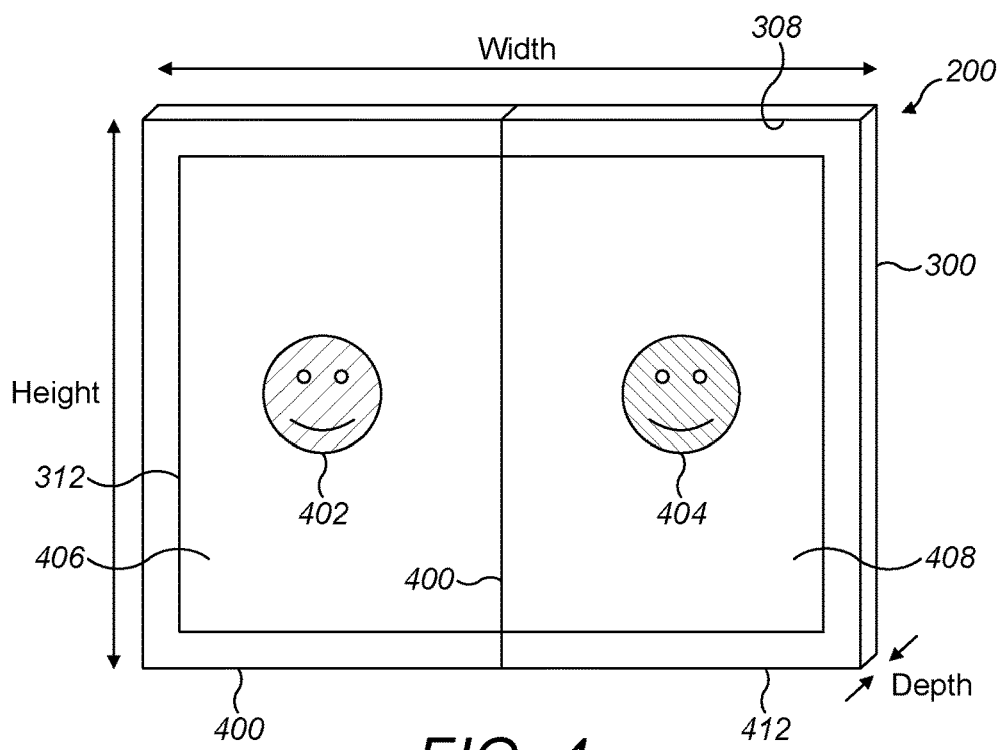
Figure 5:
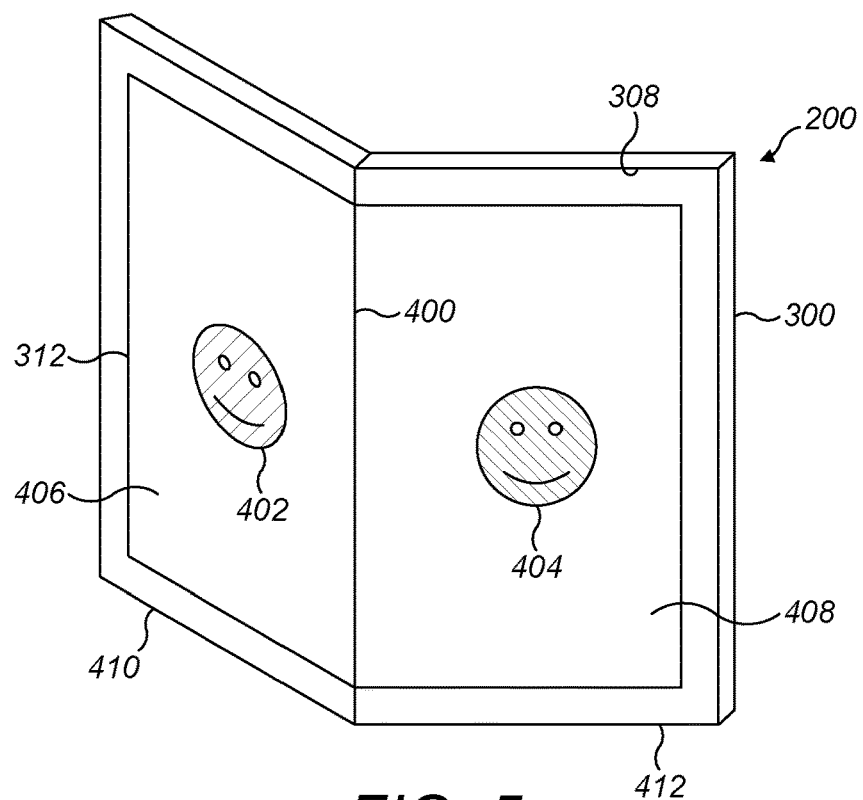
Figure 6:
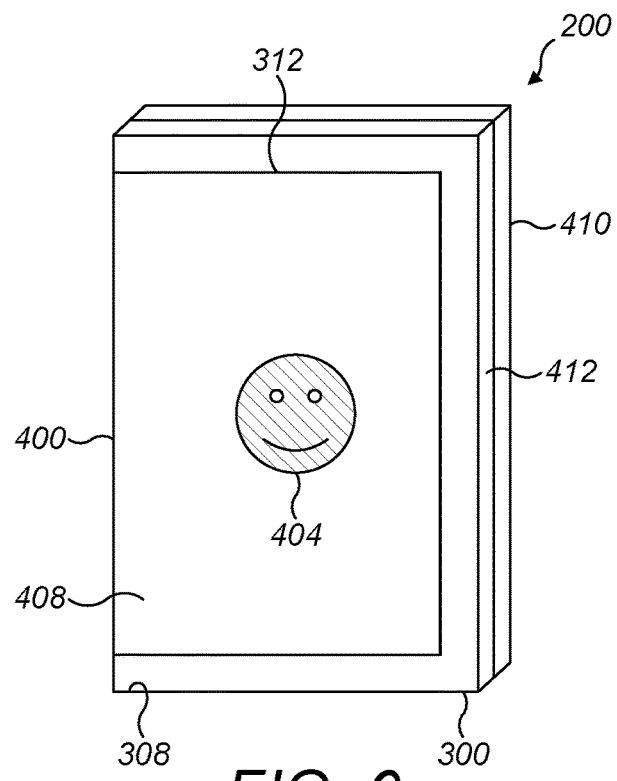

FIG. 4 illustrates an example of the device 300 embodied as a foldable device 300. The device 300 has a slate form factor. The device 300 is in an open state. In the open state, the foldable device 300 has a relatively large size in a first dimension (width), defining a tablet mode of operation. FIG. 5 illustrates the foldable device 300 of FIG. 4 in a partially-folded state while the device 300 is being folded about a fold line 400. FIG. 6 illustrates the foldable device 300 of FIG. 4 in a closed state representing a different form factor.

In the closed state, the foldable device 300 has a relatively small size in the first dimension, defining a smartphone mode of operation. For example, the device 300 in the closed state may be folded in half. The width of the device 300 may be less than in the open state but the maximum depth of the device 300 may be greater.

The axis about which the foldable device 300 can be folded is illustrated by a fold line 400. The fold line 400 enables a first section 410 of the device 300, to the left of the fold line 400, to be folded relative to a second section 412 of the device 300, to the right of the fold line 400.

A first display area 406 is shown to a first side of the fold line 400 at the first section 410. A second display area 408 is shown to a second side of the fold line 400 at the second section 412. The first display area 406 and the second display area 408 are illustrated as part of a same flexible display 312, but alternatively they could be provided by separate displays.

The device 300 may be backwards-foldable as illustrated herein, so that the first display area 406 and the second display area 408 face away from each other and cannot both be viewed at once by the same person. Alternatively or additionally, the device 300 may be forwards-foldable so that the display areas 406, 408 face each other, however at least one display area may be at least partially unconcealed.

A first onboard loudspeaker (not shown) may be to a first side of the fold line 400 and a second onboard loudspeaker (not shown) may be to a second side of the fold line 400. Alternatively, both onboard loudspeakers may be to the same side of the fold line 400.

In accordance with various examples of the present disclosure, the foldable device 300 of FIG. 4 is controlled according to the method 100, so that audio associated with audio components associated with different sides of the fold line 400 are processed differently.

For example, a first graphical user interface object (GUI object 402) is illustrated on the first display area 406. The first GUI object 402 is associated with a first audio component of the audio data 208. The first audio component and first GUI object 402 are associated with a first audio source such as a first software application and/or a first audio content item and/or a first spatial audio sound object.

Software applications provide, for example, an audio function and/or an audiovisual function. Software applications can provide access to a media player, a music streaming service, a teleconferencing service, a videoconferencing service, a messenger service, a video streaming service, etc. Therefore, different software applications represent different audio sources.

If multiple software applications are running, audio from multiple audio sources may be output concurrently or at different times. In this example, selecting an audio component comprises selecting a software application, wherein audio processed according to the method 100 is associated with the selected software application.

An audio content item is represented by a particular file (e.g. music file) or stream (e.g. voice during a communication session). The file or stream is output from a software application and/or an operating system. Different audio files and/or streams from a same software application or different software applications/the operating system may be played concurrently or at different times. In this example, selecting an audio component comprises selecting an audio content item, wherein audio processed according to the method 100 is associated with the selected audio content item.

In the case of spatial audio, a spatial audio sound object represents a sound source (track) within a sound scene. A sound scene may comprise multiple sound sources. A sound scene refers to the arrangement of the sound sources in a three-dimensional space, as opposed to stereo panning which is one-dimensional. In an example, each sound source represents a different recorded electroacoustic transducer such as a microphone or pickup. Spatial audio processing techniques enable, via metadata accompanying the audio data 208, individual sound objects to be adjusted even though the audio has been encoded and downmixed. Adjustment may comprise repositioning the sound object within the sound scene. Adjustment may comprise changing audio properties such as volume levels or audio effects. Spatial audio processing enables particular musical instruments/microphones to be muted or emphasized or moved within a sound scene. To enable spatial audio reproduction, more than two loudspeakers (onboard or external) may be provided. In this example, selecting an audio component comprises selecting a spatial audio sound object, wherein audio processed according to the method 100 is associated with the selected spatial audio sound object.

In the above examples, the audio components are audio sources. The audio sources are software applications and/or audio content items and/or spatial audio sound objects.

A second GUI object 404 is illustrated on the second display area 408. The second GUI object 404 is associated with a second audio component of the audio data 208. The second audio component and second GUI object 404 are associated with a second audio source such as a second audio application and/or a second audio content item and/or a second spatial audio sound object. Therefore, the second audio component is associated with the second audio source.

The first and second GUI objects 402, 404 may be assigned to the respective display areas 406, 408 concurrently and may be displayed concurrently.

Therefore, FIG. 4 shows two audio sources defining two selectable audio components. More audio components could be provided in other examples. Each audio component is associated with a particular side of the fold line 400.

In FIG. 6, the device 300 has been folded so that it is not possible to see both GUI objects 402, 404 at once. This is because the first display area 406 and the second display area 408 are facing in opposite directions. In the illustration, the device 300 is oriented so that the first GUI object 402 is not visible.

Figure 7:
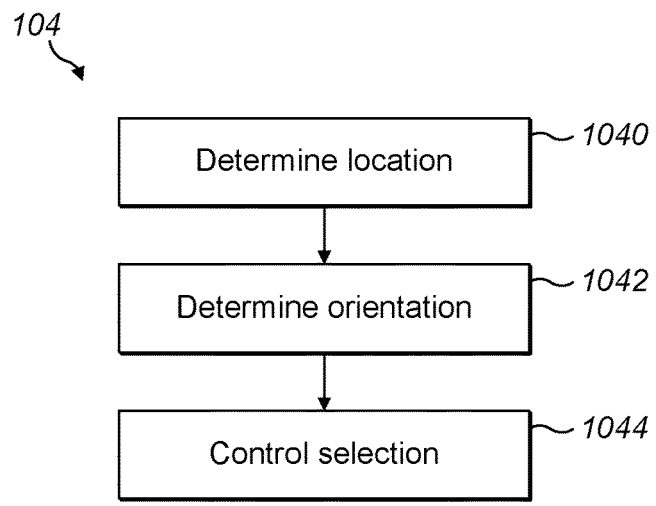

In order to select the appropriate audio to modify, the selection block 104 of the method 100 may optionally be performed using a sub-method shown in FIG. 7. The sub-method controls the selection of the audio component in dependence on an assigned location of a GUI object associated with the audio component. Block 1040 of the sub-method comprises determining the assigned location with which the audio component is associated.

The next block 1042 of the sub-method comprises determining an orientation of the device 300.

The next block 1044 of the sub-method comprises controlling the selection of the audio component in dependence on the location and the orientation.

Block 1040 of the sub-method will now be defined in more detail. Determining the location at block 1040 enables the controller 210 to keep track of how audio components are affected by a change of form factor.

Determining a location at block 1040 comprises determining a location that a GUI object associated with the audio component is assigned to. The location may be a location on the device 300. The location on the device 300 is a location on the display 312. Determining a location may comprise determining a display area. Determining a location that the GUI object is assigned to determines a location of an audio source (e.g. software application audio, spatial audio sound source audio, audio of a content item) associated with the GUI object.

In some examples, different GUI objects may be assigned to different display areas to different sides of the axis (e.g. fold line 400) before the change of form factor. In response to the change of form factor, the assignments may stay the same or may change to different display areas. After the change of form factor, a display area associated with one GUI object may remain in the foreground and visible to the user, based on the orientation of the device 300 relative to the user. The GUI object is a foreground object and is not selected for applying the audio processing. A display area associated with another one of the GUI objects may physically move relative to the user when the form factor changes and may no longer be visible, so that the other GUI object may not remain visible to the user. The non-visible GUI object becomes a background object, and its associated audio component is selected for applying the audio processing such as increasing its perceived ambience. Therefore, selecting an audio component is dependent on which side of a fold line 400 the location is.

In some examples, a GUI object may be displayed in a maximised view before the change of form factor. In the maximised view, the GUI object may be assigned to display areas to either side of the axis. The GUI object may be minimised to a subset (e.g. one) of the plurality of display areas to one side of the axis, when the form factor changes. If the GUI object is minimised to a visible display area, then the GUI object remains a foreground object and is not selected. If the GUI object is minimised to a non-visible display area, then the GUI object becomes a background object. The audio component associated with the background object is selected for applying the audio processing.

The term 'assigned' refers to user assignment and/or apparatus/device assignment. The user assignment comprises a user positioning GUI objects 402, 404 on the display 312, to different sides of the fold line 400. User positioning may comprise dragging and dropping or flicking/swiping icons/windows representing GUI objects 402, 404 and/or software applications to the different display areas 406, 408. It would be appreciated that locations of GUI objects 402, 404 may be assignable to different display areas of the display 312, by methods other than changing the form factor of the device 300.

Apparatus/device assignment comprises the apparatus 200 or device 300 positioning GUI objects 402, 404 on the display 312, in response to detecting the change in form factor. The change in form factor may trigger the assignment without the need for further user intervention. For example, a software application previously assigned to both display areas 406, 408 may be automatically minimized to a single display area 406 or 408 when the form factor changes.

The term 'assigned' does not necessarily mean that the GUI object 402 or 404 is displayed. The first display area 406 and/or the second display area 408 could be switched off so that a GUI object is not displayed but its associated audio may continue playing.

In an example implementation comprising a fold line 400, the controller 210 performs block 1040 by determining to which side of the fold line 400 the location is. The controller 210 may use stored information indicating the location of the axis (e.g. fold line 400). If the device 300 does not comprise a fold line, a different check may be performed. For example, in the case of a rollable device, the determination may be whether the location is at an unrolled or a rolled portion of the device 300. For example, the audio processing may be applied to audio components associated with GUI objects located at a rolled portion, and not for audio components associated with GUI objects located at an unrolled portion.

In an example in which the loudspeakers are onboard loudspeakers 306, the selection may be dependent on whether a loudspeaker outputting audio associated with the audio component moves in the same sense as the location associated with the audio component. The movement of a first loudspeaker in the same sense as the location may physically create an intuitive foreground/background audio effect for audio for the first loudspeaker. No audio processing may be needed, at least with respect to the first loudspeaker. If a second loudspeaker does not move in the same sense as the location associated with the audio component, then audio processing may be applied to audio for the second loudspeaker. Therefore, the selection may be dependent on the location associated with the audio component relative to a loudspeaker outputting the audio associated with the audio component.

Determining a location on the device 300 as described above may comprise determining a location on the display 312. A location on the display 312 may be calculated by determining a software GUI location such as a position within a GUI frame buffer, for example. A location on the device 300 may be calculated by further mapping the GUI location to a physical location on the device 300, using known information indicating form factor and display dimensions.

Block 1042 of the sub-method will now be defined in more detail. Determining the orientation at block 1042 may comprise determining the orientation of the device with respect to a user of the device. Determining the orientation at block 1042 may comprise reading an output of the orientation sensor 318, if provided. Determining the orientation may comprise determining an orientation of at least one location determined at block 1040, with respect to the user, to check if the location is facing the user.

According to an example use case, the location may be determined to be oriented towards the user when the orientation reaches a threshold for being oriented towards the user. In some examples, the threshold for selecting the audio component may be an angle from the range 0 to approximately 30 degrees relative to an axis perpendicular to the display 312 or relative to an orientation sensor optical axis. Alternatively, the threshold may be reached when the location is on a device section that is oriented more towards the user than the other device section(s).

If the orientation sensor 318 is a camera, the orientation may be checked by determining via image processing whether a user's body or head is in-shot of a front-facing camera. If so, then an audio component associated with a location on a same side of a same section of the device 300 as the front-facing camera is not selected, but an audio component associated with a location on a different side and/or section of the device 300 may be selected instead Direct detection of the user is not necessarily a requirement. In another example, determining the orientation comprises determining that a user's body or head is not in shot, and therefore determining that the section comprising the camera is not facing the user. A light sensor could be used instead of a camera. For example, a portion of the device 300 comprising the light sensor may be determined to be not facing towards the user when no light is detected, for example because the device has been placed on a surface with the light sensor facing the surface. The orientation could even be estimated without a camera or light sensor, by detecting where (e.g. to which side of the fold line 400) user-device interaction occurs after a change of form factor. The user may interact with a display area facing away from the user less or not at all, after the change of form factor.

There are many other ways of determining orientation which could be applied herein. A camera is practical because many hand-portable electronic devices already have cameras.

If the orientation sensor 318 is external from the device 300, gaze tracking techniques may be used. If the orientation sensor 318 is worn, the device 300 may be in the field of view of the sensor and its orientation may be determined by image processing.

For device styles with concealed and unconcealed configurations (e.g. slider, swivel or undocking sections), an orientation check may be unnecessary. Block 1042 could be implemented as a check of whether the location is visible to the user, performed by checking whether the device form factor is in a concealed configuration.

If the device 300 is flexible/foldable and has more than two sections and more than one fold line 400/axis, one or more sections other than the section(s) facing the user may be selected. This could be achieved with one orientation sensor 318. Alternatively, multiple orientation sensors could be provided for more accuracy. If multiple audio components are selected that are associated with differently oriented locations (e.g. on different sections), audio processing parameters may differ with respect to the different audio components.

According to the above example sub-method, the condition for selecting an audio component is based on whether the orientation of the location reaches a threshold for facing towards the user and/or based on whether the location is visible to the user. The condition may be satisfied when the orientation is not towards the user and/or when the location is not visible.

The condition may be checked when the form factor changes. The condition may be checked when the orientation changes, for example if the user flips a folded device over to use the display area previously facing away, then the audio components associated with now-visible display area locations will no longer be selected, and the previously non-selected audio components will now be selected.

Once an audio component has been selected, audio associated with the selected audio component(s) is extracted from audio data and passed to block 106 of the method and is then provided to the loudspeaker(s) at block 108.

Audio associated with any non-selected audio component(s) may bypass block 106 of the method 100 and pass to the one or more loudspeakers at block 108 without the audio processing, or with lesser audio processing. In some use cases, processed audio associated with a selected audio component may be output concurrently with unprocessed audio associated with a non-selected audio component.

The processing at block 106 ensures that the processed audio has perceptibly different sound characteristics from any non-processed audio. According to various, but not necessarily all examples of the disclosure, this is because the controlling audio processing comprises controlling an audio signal processing effect, which will be described in detail below. However, it would be appreciated that in an alternative use case, new or synthesized audio content uncorrelated with the unprocessed audio may be added, e.g. an alert sound or verbal message. The modifying could even comprise muting, however an undesirable consequence would be failing to get the user's attention e.g. when a conference caller is added but assigned to a non-visible section of the device 300.

The audio signal processing effect results in processed audio that is correlated with the original unprocessed audio. The processed audio (wet) and unprocessed original audio (dry) may be output concurrently according to a particular dry/wet ratio, or only the wet audio may be output.

According to various, but not necessarily all examples, the audio signal processing effect is to increase a perception of indirectness, also referred to as ambience, of the audio. Sound waves that reach a listener indirectly generally comprise reverberations and echoes, which may be subject to frequency changes. Increasing the indirectness of the path increases the level of perceived indirectness. Therefore, the audio signal processing effect is an ambience effect. The effect may comprise one or more of: filtering; reverberation; echo; decorrelation; divergence; or spreading, defined as:

Filtering: Sound waves tend to lose low-energy, high frequency content more rapidly than high-energy, low frequency content. Therefore, indirect sound tends to sound more muffled, with less treble than direct sound. A filter such as a low-pass filter can model this phenomenon to increase a perception of indirectness and ambience. In other examples, the ambience can be increased with another type of filter such as a band-pass filter or high-pass filter, for example to enhance frequencies already carrying reverb or echo or harmonic overtones.

Reverberation: when large numbers of delayed signals are mixed, a reverberation effect is produced. The resulting sound has the effect of being presented in a large room with many reflective surfaces.

Echo: one or more delayed signals is added to the original signal. Subsequent echoes may be quieter than previous echoes. The delay may be 35 milliseconds or more to be perceived as echo rather than reverberation.

Decorrelation: an audio source signal is transformed into multiple output signals with different waveforms from each-other but which sound similar. Distributing the different signals to different loudspeakers creates a sensation of space.

Divergence: when left, right, and centre channels are available, the sound can be mixed entirely into the centre channel or split equally between the left and right channels to create the impression of a wide sound source.

Spreading: an audio signal can be divided into frequency bands, and the different frequency bands can be panned into different positions.

In other implementations, a different effect could be used such as pitch-shifting or volume control and/or the like. However, ambience effects provide the user with a useful sense of foreground audio and background audio with less intrusiveness. Reducing volume or changing pitch could affect perceptibility and fidelity.

Parameters of the effect may be calibrated to preserve at least some fidelity, for example to ensure that spoken words or lyrics remain perceivable.

Figure 8:
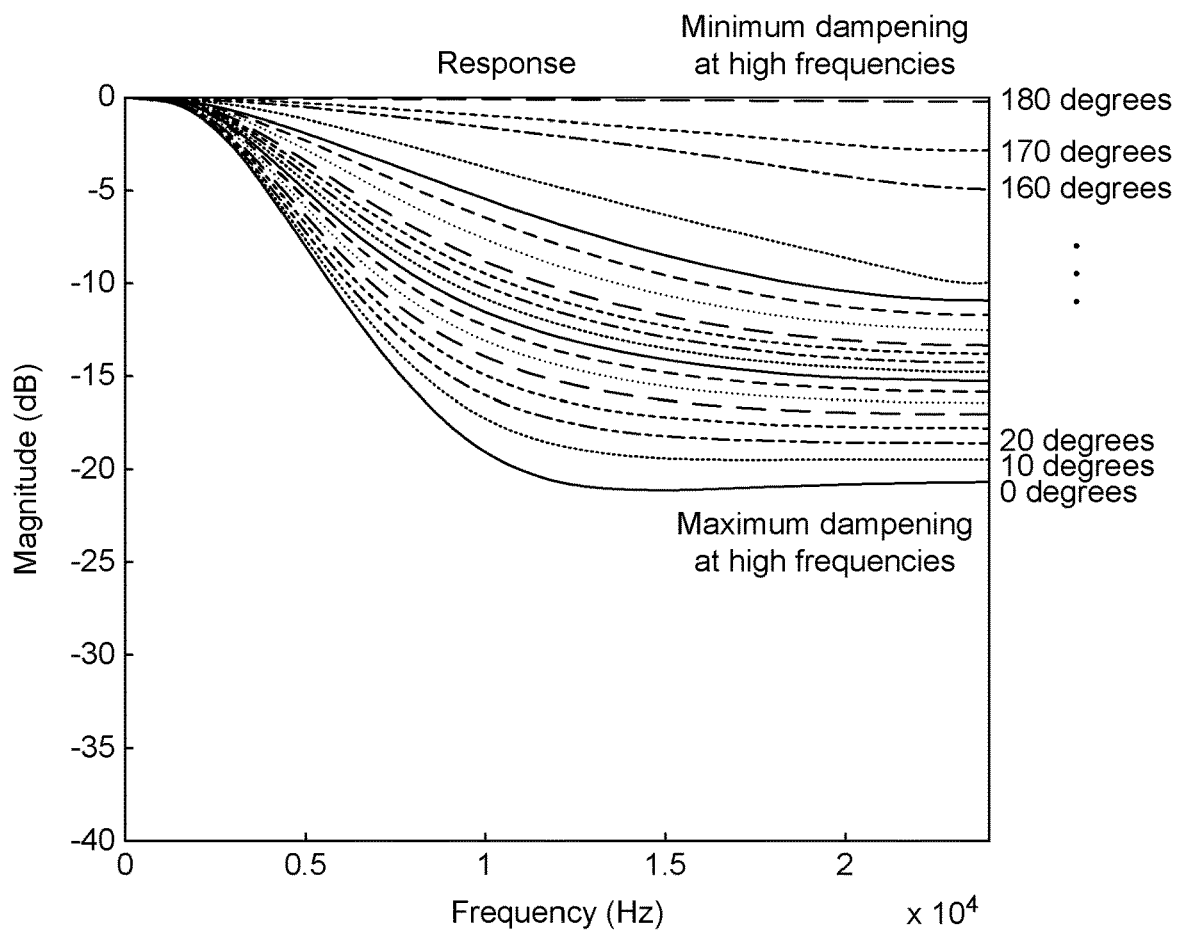
Figure 9A:
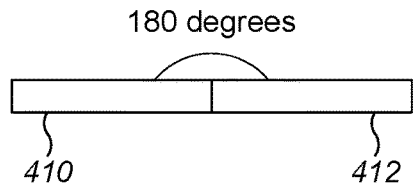
Figure 9B:
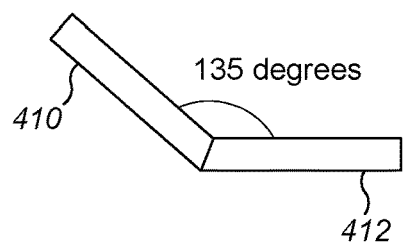
Figure 9C:
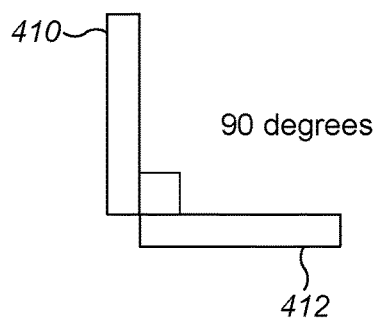
Figure 9D:
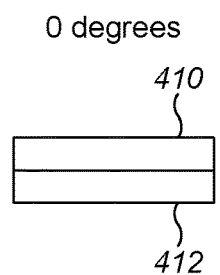

FIG. 8 illustrates low pass filter frequency response curves, in an example in which the signal processing effect is filtering. The filter gains and/or cutoff frequencies may be tuned by factory calibration or by a user of the apparatus 200.

FIG. 8 shows a plurality of frequency response curves, according to an example in which the extent of the effect is dependent on an extent of a change of form factor of the device 300. The form factor sensor 316 may be configured to determine the extent of the change of form factor. A first change of form factor in a first direction may result in a first increase in the effect, and a further change of form factor in the same direction may result in a further increase of the effect.

In an example, as the device 300 is progressively folded in half as shown from FIG. 9A to FIG. 9D, the roll-off gain may be increased and/or the cutoff frequency may be decreased continuously or in discrete steps proportionally to fold angle detected by the form factor sensor 316, as shown by the different response curves in FIG. 8. In the case of reverberation, the wet/dry ratio may increase, the decay time may increase or a 'room size' parameter may increase. In the case of echoes, wet/dry ratio may increase, decay time may increase, or a number of echo tracks may increase. In the case of decorrelation, divergence and spreading, the width of the perceived sound source may increase.

Figure 10:
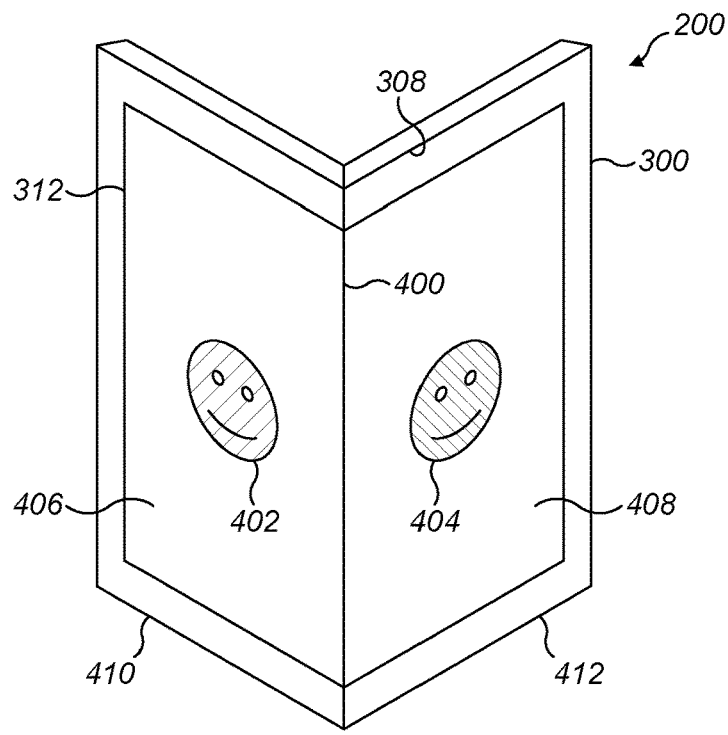
FIG. 10 illustrates an example of a foldable apparatus in a partially-folded state.

FIG. 10 illustrates an example in which none of the audio components are associated with locations that are determined to be facing towards the user. It is therefore possible in an example that by applying block 1042, all of the audio components will be selected for the audio processing. Further, the extent of the effect on each selected audio component may be dependent on an extent of the change of orientation of the device with respect to the user, or more specifically dependent on an extent of the change of orientation of each of the locations associated with the selected audio components, with respect to the user. Therefore, if the first GUI object 402 is facing the user to a greater extent than the second GUI object 404, the audio effect may be applied to a greater extent to the first GUI object 402 than to the second GUI object 404.

FIG. 11 illustrates an example in which the audio component corresponds to a spatial audio sound object, and the apparatus 200 comprises means for controlling a position of a spatial audio sound object in a sound scene in dependence on the change in form factor of the device 300.

The audio data may already be spatial audio data, or the apparatus 200 may create simulated spatial audio data from non-spatial audio data, in response to the form factor changing.

A first sound object 1102 associated with the first section 410 of the device 300 is illustrated and a second sound object 1104 associated with the second section 412 of the device 300 is illustrated. The locations of the sound objects 1102, 1104 within a sound scene may correspond to the locations of corresponding GUI objects 402, 404 which may be concurrently displayed on the display 312. In other examples, the sound objects 1102, 1104 may be spread further apart beyond the boundaries of the display 312, depending on the arrangement of the loudspeakers.

In a first scenario, the device 300 is in the open state (tablet mode), and the sound objects 1102, 1104 are in-position. When the device 300 is in the closed state (smartphone mode), compensation may be performed to ensure the sound objects 1102, 1104 stay in position. The apparatus 200 may modify spatial audio processing parameters if the loudspeakers are onboard loudspeakers 306 on different sections 410, 412 of the device 300, to compensate for movement of the loudspeakers by the folding. An ambience effect may be optionally applied to a selected sound object as described earlier.

In a second scenario, the device 300 is in the open state (tablet mode), and the sound objects 1102, 1104 are in-position. When the device 300 is closed (smartphone mode), the selected sound object is selected by block 104 of the method 100 and its position in the sound scene is moved spatially by block 106 of the method 100, in dependence on the form factor. For example, if a section of the device 300 comprising the location associated with a sound object is moved to the back of the device 300 by folding the device 300, the corresponding sound object position may be moved in a similar way. The sound object position could be moved to increase a perceived distance and/or increase a perceived spread. An ambience effect may be optionally applied to the audio corresponding to the selected sound object as described earlier. The sound object position could even be moved to a position in the sound scene behind the user's head, to provide a background effect.

In a third scenario, that is an extension of the second scenario, an extent of the change in sound object position may be dependent on the extent of the change in form factor. For example, the position may be moved continuously or in discrete steps proportionally to fold angle detected by the form factor sensor 316. In analogy to FIG. 10, if neither sound source object corresponds to a location facing the user, then the positions of both sound objects 1102, 1104 may be moved.

According to the various examples provided in this disclosure, but not necessarily all examples, the same loudspeakers output audio associated with the same audio components, both before and after the change in form factor. In other words, changing the form factor does not necessarily deactivate any loudspeakers, but it could do in other examples.

According to the above examples, but not necessarily all examples, the method 100 could be automatically performed when the form factor changes. This is useful because some devices automatically reassign GUI icons/windows to different display areas when the form factor changes, so applying different audio effects as described above will provide a useful indication of where the icons/windows now are.

In some examples, the method 100 could be performed when an audio component is reassigned to a different location on the device 300. For example, if the user flicks/drags/swipes an icon/window associated with an audio component to another side of the fold line 400, the change in audio effect will serve as a confirmation that the reassignment has been successful.

In some examples, the method 100 could be performed when there are multiple audio components and/or when new audio components are added. Therefore, when many people in a video are talking, the user can easily identify from which display area the sounds are coming from based on the modified audio. Further, when a user has many software applications open and an advertisement or other content starts playing from one application, the user will know from the modified audio on which display area the sound producing software application resides.

FIG. 12A illustrates an example of a controller 210. Implementation of a controller 210 may be as controller circuitry. The controller 210 may be implemented in hardware alone, have certain aspects in software including firmware alone or can be a combination of hardware and software (including firmware).

As illustrated in FIG. 12A the controller 210 may be implemented using instructions that enable hardware functionality, for example, by using executable instructions of a computer program 1206 in a general-purpose or special-purpose processor 1202 that may be stored on a computer readable storage medium (disk, memory etc) to be executed by such a processor 1202.

The processor 1202 is configured to read from and write to the memory 1204. The processor 1202 may also comprise an output interface via which data and/or commands are output by the processor 1202 and an input interface via which data and/or commands are input to the processor 1202.

The memory 1204 stores a computer program 1206 comprising computer program instructions (computer program code) that controls the operation of the apparatus 200 when loaded into the processor 1202. The computer program instructions, of the computer program 1206, provide the logic and routines that enables the apparatus to perform the methods illustrated in FIGS. 1 and 7. The processor 1202 by reading the memory 1204 is able to load and execute the computer program 1206.

The apparatus 200 therefore comprises: at least one processor 1202; and at least one memory 1204 including computer program code; the at least one memory 1204 and the computer program code configured to, with the at least one processor 1202, cause the apparatus 200 at least to perform: receiving (102) an indication of a form factor of a device 300; selecting (104) an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; controlling (106) audio processing of audio 208 associated with the selected audio component; and providing (108) at least the processed audio 202 for audio output by one or more loudspeakers 2, 304.

As illustrated in FIG. 12B, the computer program 1206 may arrive at the apparatus 200 via any suitable delivery mechanism 1208. The delivery mechanism 1208 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1206. The delivery mechanism may be a signal configured to reliably transfer the computer program 1206. The apparatus 200 may propagate or transmit the computer program 1206 as a computer data signal.

Computer program instructions for causing an apparatus to perform at least the following or for performing at least the following: causing receiving an indication of a form factor of a device; causing selecting an audio component, in dependence on the receiving an indication of a form factor of the device and in dependence on an assigned location of a graphical user interface object associated with the audio component, wherein the graphical user interface object is assigned to at least a first display area when the device is in a first form factor and is assigned to the at least a first display area when the device is in a second form factor; causing controlling audio processing of audio associated with the selected audio component; and causing providing at least the processed audio for audio output by one or more loudspeakers.

The computer program instructions may be comprised in a computer program, a non-transitory computer readable medium, a computer program product, a machine readable medium. In some but not necessarily all examples, the computer program instructions may be distributed over more than one computer program.

Although the memory 1204 is illustrated as a single component/circuitry it may be implemented as one or more separate components/circuitry some or all of which may be integrated/removable and/or may provide permanent/semi-permanent/dynamic/cached storage.

Although the processor 1202 is illustrated as a single component/circuitry it may be implemented as one or more separate components/circuitry some or all of which may be integrated/removable. The processor 1202 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 1 and 7 may represent steps in a method and/or sections of code in the computer program 1206. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example, the display may be separate from the device, and the form factor of the device may control the display.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
at least one processor; and
at least one non-transitory memory including computer program code;
the at least one memory and the computer program code configured to, with the at least one processor, cause the apparatus at least to perform:
receiving an indication of a form factor of a device;
selecting an audio component for audio processing, in dependence on the received indication of the form factor of the device and in dependence on an assigned location of a graphical user interface object associated with the audio component, wherein the graphical user interface object is assigned to at least a first display area when the device is in a first form factor and is assigned to at least the first display area when the device is in a second form factor, wherein the audio component is one of: a spatial audio source for audio processing, a software application for audio processing, or an audio content item for audio processing;
controlling audio processing of audio associated with the selected audio component to at least one of:
modify a location of the audio associated with the selected audio component to be different from the assigned location of the graphical user interface object associated with the selected audio component, or
process the audio associated with the selected audio component to increase a perceived ambience of the audio; and
providing at least the processed audio for audio output with one or more loudspeakers.

2. The apparatus of claim 1, wherein the form factor is dependent on flexing of a body of the device.

3. The apparatus of claim 1, wherein the form factor is dependent on folding of a body of the device.

4. The apparatus of claim 1, wherein the graphical user interface object corresponds to at least one of: the spatial audio source; the software application; or the audio content item.

5. The apparatus of claim 1, wherein the first display area is configured to move relative to a second display area of the device when the form factor of the device is changed, and wherein selecting the audio component is dependent on which one of the first display area or the second display area the graphical user interface object is assigned to.

6. The apparatus of claim 1, wherein selecting the audio component is dependent on which side of a fold line the assigned location is.

7. The apparatus of claim 1, wherein selecting the audio component is dependent on an orientation of the device, wherein the audio component is selected based, at least partially, on one of:
   a determination that the assigned location is not oriented towards a user of the device, or
   a determination that the first display area is at least partially facing away from the user based, at least partially, on the form factor,
wherein the audio component is the spatial audio source.

8. The apparatus of claim 1, wherein an extent of controlling the audio processing is dependent on an extent of a change of the form factor of the device or is dependent on an extent of a change of orientation of the device with respect to a user of the device.

9. The apparatus of claim 1, wherein controlling audio processing comprises controlling an audio signal processing effect.

10. The apparatus of claim 9, wherein the audio signal processing effect comprises at least one of: filtering; reverberation; echo; decorrelation; divergence; or spreading.

11. The apparatus of claim 1, wherein the at least one memory and the computer program code are further configured to, with the at least one processor, cause the apparatus to perform:
   controlling a position of a spatial audio sound object in a sound scene in dependence on a change in the form factor of the device, wherein the audio component comprises the spatial audio sound object.

12. The apparatus of claim 1, wherein the at least one memory and the computer program code are further configured to, with the at least one processor, cause the apparatus to perform:
   concurrently providing the audio associated with the selected audio component and audio associated with a non-selected audio component for output with the one or more loudspeakers, wherein the audio associated with the selected audio component is processed differently from the audio associated with the non-selected audio component.

13. The apparatus of claim 1, embodied as the device or as a controller of the device.

14. A method comprising:
   receiving an indication of a form factor of a device;
   selecting an audio component for audio processing, in dependence on the received indication of the form factor of the device and in dependence on an assigned location of a graphical user interface object associated with the audio component, wherein the graphical user interface object is assigned to at least a first display area when the device is in a first form factor and is assigned to at least the first display area when the device is in a second form factor, wherein the audio component is one of: a spatial audio source for audio processing, a software application for audio processing, or an audio content item for audio processing;
   controlling audio processing of audio associated with the selected audio component to at least one of:
      modify a location of the audio associated with the selected audio component to be different from the assigned location of the graphical user interface object associated with the selected audio component, or
      process the audio associated with the selected audio component to increase a perceived ambience of the audio; and
   providing at least the processed audio for audio output with one or more loudspeakers.

15. A method as claimed in claim 14, wherein the form factor is dependent on flexing of a body of the device.

16. A method as claimed in claim 14, wherein the form factor is dependent on folding of a body of the device.

17. A method as claimed in claim 14, wherein the graphical user interface object corresponds to at least one of: the spatial audio source; the software application; or the audio content item.

18. A method as claimed in claim 14, wherein the first display area is configured to move relative to a second display area of the device when the form factor of the device is changed, and wherein the selecting of the audio component is dependent on which one of the first display area or the second display area the graphical user interface object is assigned to.

19. A method as claimed in claim 14, wherein the selecting of the audio component is dependent on at least one of:
   on which side of a fold line the assigned location is; or
   an orientation of the device.

20. A non-transitory computer readable medium comprising program instructions for causing an apparatus to perform at least the following:
   causing receiving an indication of a form factor of a device;
   causing selecting an audio component for audio processing, in dependence on the received indication of the form factor of the device and in dependence on an assigned location of a graphical user interface object associated with the audio component, wherein the graphical user interface object is assigned to at least a first display area when the device is in a first form factor and is assigned to at least the first display area when the device is in a second form factor, wherein the audio component is one of: a spatial audio source for audio processing, a software application for audio processing, or an audio content item for audio processing;
   causing controlling audio processing of audio associated with the selected audio component to at least one of:
      modify a location of the audio associated with the selected audio component to be different from the assigned location of the graphical user interface object associated with the selected audio component, or
      process the audio associated with the selected audio component to increase a perceived ambience of the audio; and
   causing providing at least the processed audio for audio output with one or more loudspeakers.

* * * * *